United States Patent [19]
Reichenbach et al.

[11] Patent Number: 6,073,847
[45] Date of Patent: Jun. 13, 2000

[54] METHOD AND APPARATUS FOR THE READING OF A BAR CODE

[75] Inventors: Jürgen Reichenbach, Emmendingen; Hubert Uhl, Waldkirch; Peter Hauser, Freiburg, all of Germany

[73] Assignee: Sick AG, Waldkirch, Germany

[21] Appl. No.: 09/044,494

[22] Filed: Mar. 19, 1998

[30] Foreign Application Priority Data

Mar. 21, 1997 [DE] Germany .......................... 197 11 873

[51] Int. Cl.⁷ .................................................. G06K 7/10
[52] U.S. Cl. ...................................................... 235/462.12
[58] Field of Search ........................................ 235/462.12

[56] References Cited

U.S. PATENT DOCUMENTS

| | | |
|---|---|---|
| 4,973,829 | 11/1990 | Ishida . |
| 5,028,772 | 7/1991 | Lapinski . |
| 5,124,538 | 6/1992 | Lapinski . |
| 5,155,344 | 10/1992 | Fardeau . |
| 5,241,164 | 8/1993 | Pavlidis . |
| 5,296,691 | 3/1994 | Waldron et al. ................ 235/462.12 |
| 5,444,231 | 8/1995 | Shellhammer . |
| 5,466,921 | 11/1995 | Lapinski . |

FOREIGN PATENT DOCUMENTS

| | | |
|---|---|---|
| WO 92/05516 | 4/1992 | WIPO . |
| WO 94/07213 | 3/1994 | WIPO . |

*Primary Examiner*—Harold I. Pitts
*Attorney, Agent, or Firm*—Townsend and Townsend and Crew LLP

[57] ABSTRACT

A method is described for the reading of a bar code consisting of a predetermined number of code elements for the generation of a binary signal with sequential high and low phases, the lengths of which correspond to the width of the sequential code elements, in particular with a reading direction extending obliquely to the code elements. The code elements are sensed by one or more sensing beams of a bar code reader along scanning lines extending substantially parallel to one another, with each region of a code element scanned by a scanning line forming a code element section. For substantially each scanning line those code segments which consist of a code element section, or a plurality of sequential code element sections, are detected, which are recognized as permissible code segments on the basis of preset decision criteria. A reference code element is found from mutually associated code element sections, each representing the same code element of the bar code for different scanning lines, and the binary signal is produced from the reference code elements. Furthermore, an apparatus is described for carrying out the method.

39 Claims, 5 Drawing Sheets

METHOD AND APPARATUS FOR THE READING OF A BAR CODE

FIELD OF THE INVENTION

The present invention relates to a method of reading a bar code consisting of a predetermined number of code elements for the generation of a binary signal with sequential high and low phases, the lengths of which correspond to the width of the sequential code elements, in particular with a reading direction extending obliquely to the code elements. Furthermore, the invention is directed to an apparatus for the carrying out this method.

DESCRIPTION OF PRIOR ART

Customary methods of this kind can only decode a bar code when a semiconductor beam sweeps over the full length of the bar code along at least one scanning line. In order to ensure such complete sweep, the angle between the scanning direction and the perpendicular to the bar orientation of the bar code (tilt angle) must be almost equal to zero or as small as possible.

In order to achieve a corresponding alignment of the bar code to be scanned, it is either necessary to carry out complicated checking measures for the positional checking of the bar code or, for example, to provide apparatuses for the omnidirectional sensing of the bar code.

OBJECT OF THE INVENTION

The present invention is based on the object of so developing a method and an apparatus of the initially named kind that a scanned bar code is also reliably recognized when the tilt angle is so large that a complete sweep of the bar code along a single scanning line is not possible.

SUMMARY OF THE INVENTION

This object is satisfied, starting from a method of the initially named kind, wherein the code elements are sensed by one or more sensing beams of a bar code reader along scanning lines extending substantially parallel to one another, wherein each region of a code element scanned by a scanning line forms a code element section, wherein, for substantially each scanning line, those code segments which consist of a code element section or a plurality of sequential code element sections are detected, which are recognized as permissible code segments on the basis of preset decision criteria, wherein in each case a reference code element is found from mutually associated code element sections, each representing the same code element of the bar code for different scanning lines, and wherein the binary signal is produced from the reference code elements.

The part of the underlying object relating to the apparatus is satisfied by an apparatus of the initially named kind which is characterized by a bar code reader which transmits one or more scanning beams for the sensing of the code elements along scanning lines extending substantially parallel to one another, wherein each region of the code element sensed by a scanning line forms a code element section, by a code segment selection means for the determination of permissible code segments as a result of predetermined decision criteria and consisting of one code element section or of a plurality of sequential code element sections, by a code segment detection means for the detection of the code segments recognized as permissible by the code segment selection means for substantially each scanning line, by a reference code element determining means for determining in each case a reference code element from respective, mutually associated code element sections representing the same code element of the bar code and detected for different scanning lines, and by a signal generating means for the generation of the binary signal from the reference code elements.

Both the bars and also the gaps of the bar code present between the bars are termed code elements. The code elements are split up during the scanning by the scanning beam which sweeps over the code elements into individual regions, which will be termed code element sections in the following. The regions of the bar code consisting of code element sections arranged in series will be termed code segments in the following and consist in the minimum case of a single code element section and in the maximum case of code element sections of the code elements of the entire bar code.

Through the method of the invention a two-dimensional image of the bar code is produced, which is tilted by the tilt angle with respect to the scanning direction. Mutually associated code element sections, in each case representing the same code element of the scanned bar code and from which in each case a reference code element is formed, are extracted from the two-dimensional image for different scanning lines. The binary signal that is sought is produced and the bar code is decoded with respect to the reference code elements that are found.

It is advantageous that only a single decoding is necessary per bar code and that it is not necessary to carry out a decoding for each scanning line. Thus, very high quality, complex and thus time intensive algorithms can be used which have a low error rate.

The scanning lines which extend substantially parallel to one another over the bar code are produced by a relative movement between the scanning beam and the article carrying the bar code. In this respect the article can either be moved essentially perpendicular to the scanning direction or the scanning beam can, for example, be moved to and fro transverse to the scanning direction by the oscillating movement of a deflecting unit. Basically it is also conceivable for the bar code reader to scan the bar code with a plurality of substantially parallel scanning beams simultaneously so that a separate scanning beam is associated with each scanning line, or with a part of the scanning line. Any desired combinations of these two methods are also conceivable.

In accordance with an advantageous embodiment of the invention, a shift present in the scanning direction between code elements detected for different scanning lines, which arises as a result of the scanning direction extending obliquely to the code elements, is evaluated to the extent that code element sections respectively detected for different scanning lines and which are correspondingly shifted relative to one another are used as the mutually associated code element sections. In this respect the shift is advantageously determined with respect to a straight reference line standing substantially perpendicular to the scanning lines.

Through the evaluation of the shift between the code segments detected for different scanning lines, the image of the bar code consisting of the detected code segments is freed of distortion, i.e. the tilting of the bar code relative to the scanning direction is compensated by a tilt angle correction. In this way it is possible to additionally check whether a shift of the detected code segments by a small number of code elements, for example up to three code elements, which can occur through different influences on the error, for example the scanning movement of the scanning beam or fluctuation of the speed of rotation or the like, has to be compensated between different scanning lines. The size of such a shift is verified by a comparison of the widths of code element sections detected for sequential scanning lines.

In accordance with a further advantageous embodiment of the invention, the mutually associated code element sections respectively detected for different scanning lines are determined by determination of the tilt angle between the scanning direction and the direction perpendicular to the bar orientation of the bar code. The mutually associated code element sections can be found from the tilt angle that is determined in different ways. For example, the shift between the respective code element sections can be calculated from the tilt angle, so that this shift can be compensated. The tilt angle can advantageously also be determined wherein a two-dimensional Fourier transformation of the detected code segments is carried out and wherein the maximum amplitudes of the spectrum of magnitude that is found are determined, with the tilt angle subsequently being found from the position of the maximum amplitudes. The mutually associated code element sections that are detected can then in turn be derived from the tilt angle.

In accordance with a further preferred embodiment of the invention, the start and/or the end of the bar code is/are found by means of the start and/or stop pattern provided in the bar code. The bar code is advantageously concluded in accordance with the norm in white zones, so that the start and/or stop pattern can be formed by these white zones. Additionally, or alternatively, start and or stop markings can be provided in the bar code to form the start and/or stop pattern.

The provision of start and/or stop patterns gives, on the one hand, a pointer to the possible start or end of the scanned bar code during scanning and is, in addition, used in accordance with the invention for the control of the detection of permissible code segments along the scanning lines.

In accordance with a preferred embodiment, the detection of the permissible code segments, for example, starts when the start and/or stop pattern for at least two adjacent scanning lines is recognized. The detection preferably takes place for the first recognized scanning line containing the start and/or stop pattern and also for the scanning lines which follow it. If a start and/or stop pattern is recognized for at least two sequential scanning lines, then it is assumed that the start of a bar code is present. Thus, with code elements arranged obliquely to the scanning direction, the code segments which start with the start and/or stop pattern are in each case detected for the sequential scanning lines, with the detection also being continued for scanning lines for which no start and/or stop pattern is recognized.

The detection of the permissible code segments is terminated when a start and/or stop pattern corresponding to the recognized start and/or stop pattern is recognized a plurality of times, since, in this case, it can be assumed that essentially the whole region of the bar code along the different scanning lines has been swept over by the scanning beam.

In accordance with a further advantageous embodiment of the invention, the detection of the permissible code segments starts when essentially identical code segment sections are recognized for at least two sequential scanning lines. This variant is in particular advantageous in the event that the bar code is not provided on a planar surface but rather, for example, on a curved surface of an article or extending over an edge. In these cases it can happen that the first scanning line intersecting the bar code passes neither through a start pattern, nor through a stop pattern but rather first scans a middle part of the bar code. By the comparison of the scanned code segments of at least two sequential scanning lines, the occurrence of a bar code can also be recognized in this case with high probability.

In accordance with a further preferred embodiment of the invention, the shift between the code segments detected for different scanning lines is determined by the shift between the start patterns recognized for the corresponding scanning lines. As the position of the start pattern within the respective scanning lines can be determined relatively simply, the shift between the code segments detected for different scanning lines can be simply found in this manner. The positions of the stop patterns can also basically be determined and evaluated instead of the start patterns.

A plurality of predetermined decision criteria can be advantageously checked in order to test for permissible code segments. In particular, the appearance of a bar code and thus of a permissible code segment can be precluded in the following cases:

The width of a scanned element in the scanning direction falls short of a permissible minimum width. Since the code elements of the bar code can only have fixed predetermined widths, a scanned element which falls short of a predetermined minimum width cannot be present within a bar code. Since the width of the scanned element that is found with V-scanners depends on the scanning direction, this decision criterion can, above all, be used when the scanning direction and possibly the print resolution of the bar code are known, or when parallel scanners are used.

The width of a scanned element in the scanning direction exceeds a permissible maximum width. Here the same explanations apply analogously as for widths which fall short of a permissible minimum width of the code element.

When using a two-width code with module widths between one and a maximum of three unit widths, the ratio of sequential scanned elements is smaller than or equal to 3:1 or greater than or equal to 1:3. When using a multi-width code with module widths of one to four unit widths, the corresponding ratio is smaller than or equal to 4:1 or greater than or equal to 1:4. Since the maximum and/or minimum width ratios between sequential code elements are known for the respective bar code types, no bar code information can be present when the named conditions are exceeded or fallen short of.

The length and/or the number of elements of the code segment fall short of a predetermined minimum length or minimum number. In this way a situation is precluded in which scanned elements which are too short or which contain no important information are incorrectly accepted as permissible code segments.

The length or number of elements of the code segment in the scanning direction exceeds a predetermined maximum length, in particular the running length of the bar code, or the maximum number of possible code elements. In particular, if the running length of the bar code, or the maximum number of possible code elements, is exceeded during the scanning, then it is clear that the scanned region cannot represent a bar code.

In accordance with a further advantageous embodiment of the invention, the width of a reference code element is in each case determined by the formation of the average value of the widths of the corresponding, mutually associated code element sections of the code segments detected for the different scanning lines. In this manner, different widths of mutually associated detected code element sections are compensated, so that the average value that is formed corresponds substantially to the width of the scanned code element.

DETAILED DESCRIPTION OF THE PREFERRED EXEMPLARY EMBODIMENTS

Figure 1:
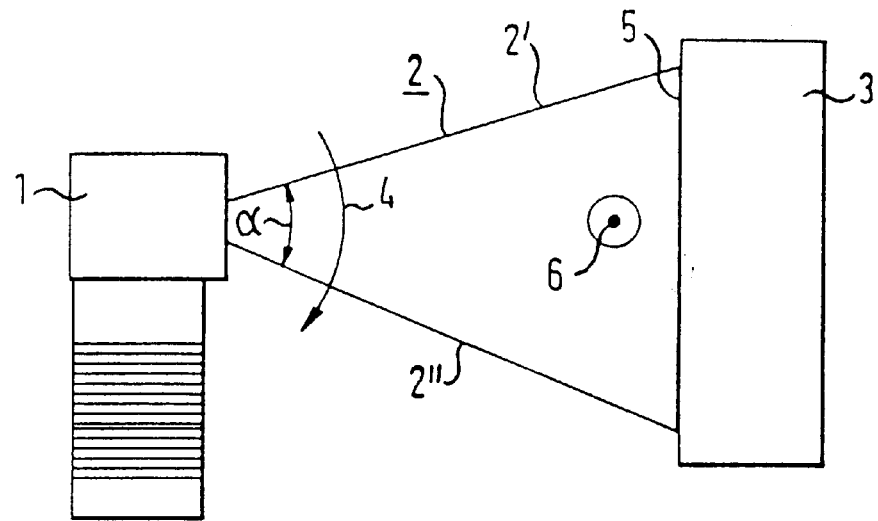
FIG. 1 is a schematic representation of a bar code reader and also of an article scanned by a scanning beam of the bar code reader.

FIG. 1 shows a bar code reader 1 which transmits a scanning beam 2 in the direction towards an article 3, on the surface of which there is arranged a bar code to be scanned. As indicated by an arrow 4, the scanning beam 2 executes a pivotal movement through an angle α, so that it moves to and fro between the positions designated with the reference numerals 2' and 2" in FIG. 1. The pivoting of the scanning beam 2 can in this arrangement take place for example by a rotating mirror arranged within the bar code reader 1.

Through the pivoting of the scanning beam 2 through the angle α, the surface of the article 3 is thus scanned along the scanning line 5.

In order to be able to sweep the scanning beam 2 over a surface of the article 3, the article 3 is, for example, moved perpendicular to the plane of pivoting of the scanning beam 2 in accordance with the arrow 6, which projects out of the surface of the drawing. The arrow 6 thus reproduces the direction of conveyance of the article 3. It is, however, basically also possible to allow the scanning beam 2 to execute a pivotal movement parallel to the arrow 6 in addition to the described pivotal movement, so that an areal scan takes place within a region of the surface of the article 3, even when the article 3 is not moved.

Furthermore, it is basically possible for the bar code reader 1 to transmit a plurality of scanning beams 2, which, for example, are synchronously pivoted within pivotal planes which extend substantially parallel to one another. The generation of a plurality of parallel scanning beams is in this respect possible, for example by means of a grid-type mirror wheel.

Figure 2:
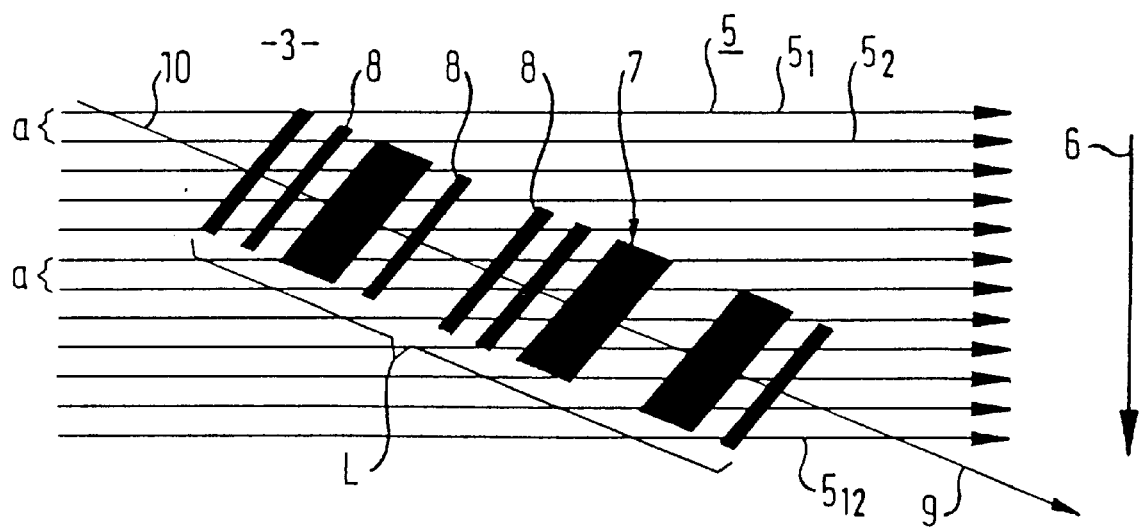
FIG. 2 is a bar code which is scanned in accordance with the method of the invention, FIGS. 3a) to 3d) illustrate four method steps of the method of the invention for the scanning of a bar code, FIGS. 4a) to 4c) illustrate three method steps of a further embodiment of the method of the invention.

FIG. 2 shows a bar code 7 which includes a plurality of code elements 8 consisting of bars and gaps, and which is arranged on the subject of an article 3 in accordance with FIG. 1.

In order to be able to reliably decode the bar code 7 with known scanning methods, the scanning beam 9 must sweep over the entire length of the bar code 7. This means that the angle between the scanning direction given by the scanning beam 9 and a perpendicular 10 to the bar orientation of the bar code, the so-called tilt angle, must be as small as possible, and in particular, if possible, equal to zero, as is the case with reference to the scanning beam 9 in FIG. 2. The scanning beam 9 thus coincides with the perpendicular 10.

The scanning lines 5 shown in FIG. 2 represent scanning lines along which a scanning beam 2 scans the surface of the article 3. In the following, all the scanning lines will fundamentally be designated with the reference numeral 5. Only if reference is to be made to a specific scanning line will this be designated by a subscript with $5_1, 5_2, \ldots 5_{12}$. The same applies to other elements shown in the drawings, the reference numerals of which are provided with a subscript for reference to a special element.

In accordance with the scanning lines 5 shown in FIG. 2, the scanning beam 2 is shifted by an angle after each complete sweep through its pivotal range on being reset into its output position, which brings about a shift of the scanning line 5 through the distance a in the direction of the arrow 6. The resulting scanning lines 5 extend in this arrangement, as shown in FIG. 2, substantially parallel to one another at regular intervals a.

The bar code 7 is so tilted relative to the scanning direction defined by the scanning lines 5 that there is no passage of the scanning beam 2 along one of the scanning lines 5, in which the scanning beam sweeps over all the code elements 8 of the bar code 7. Detection and decoding of the bar code 7 with respect to the scanning beam 2 guided along the single scanning line 5, such as is known in the prior art, is thus not possible with the oblique arrangement of the bar code 7 shown in FIG. 2.

The method of the invention for the full detection and decoding of a bar code 7 arranged obliquely to the scanning direction in accordance with FIG. 2 will be described in more detail in the following, with respect to FIG. 3.

The surface of the object 3 is scanned along the scanning lines 5 shown in FIG. 3a by the scanning beam 2, with the reflected scanning beam 2 being received by the evaluation unit and being investigated for scanned elements on the surface of the article 3. In this respect, elements that are recognized are checked, with respect to preset decision criteria, to see whether the scanned elements can possibly contain bar code information. By way of example, the width of each of the recognized elements in the scanning direction is found and is compared with the maximum permissible width of a code element 8 of the bar code 7. If the width of a scanned element is greater than the maximum permissible width of a code element 8, then the scanned element cannot represent a code element 8.

Furthermore, a check is made as to whether the widths of the scanned elements is smaller than the permissible minimum width of a code element 8 of the bar code 7. If this is the case, then the scanned element cannot be an element of the bar code 7.

Since the width of a scanned element that is found when using a V-scanner is dependent on the distance between the bar code reader 1 transmitting the scanning beam and the surface of the article 3 carrying the element, the check for minimum and maximum permissible element width can only be used in the knowledge of the scanning distance or, for example, when using a parallel scanner.

If sequential dark and bright zones are recognized along a scanning line 5, then a check is made as to whether the ratio of sequential bright and dark zones is greater or smaller than a predetermined ratio. This predetermined value is dependent on the nature of the bar code to be scanned. For a two-width code, in which the code element width exists with from one to three units of width, the ratio of sequential code elements cannot be greater than 3:1 or smaller than 1:3. If the ratio of 3:1 is exceeded, or if the ratio falls short of 1:3, then the scanned elements cannot represent code elements 8 of the bar code 7. The same applies to a multi-width code which has the code element widths 1, 2, 3 and 4. In this case the sensed elements, for which sequential bright-dark zones have a width ratio below 1:4 or above 4:1 can be rejected as elements not belonging to the bar code 7.

If elements are recognized which are not rejected as a result of the previously described decision criteria then these elements are examined in the following to see whether they can represent the start or end of the bar code 7.

Figure 3:
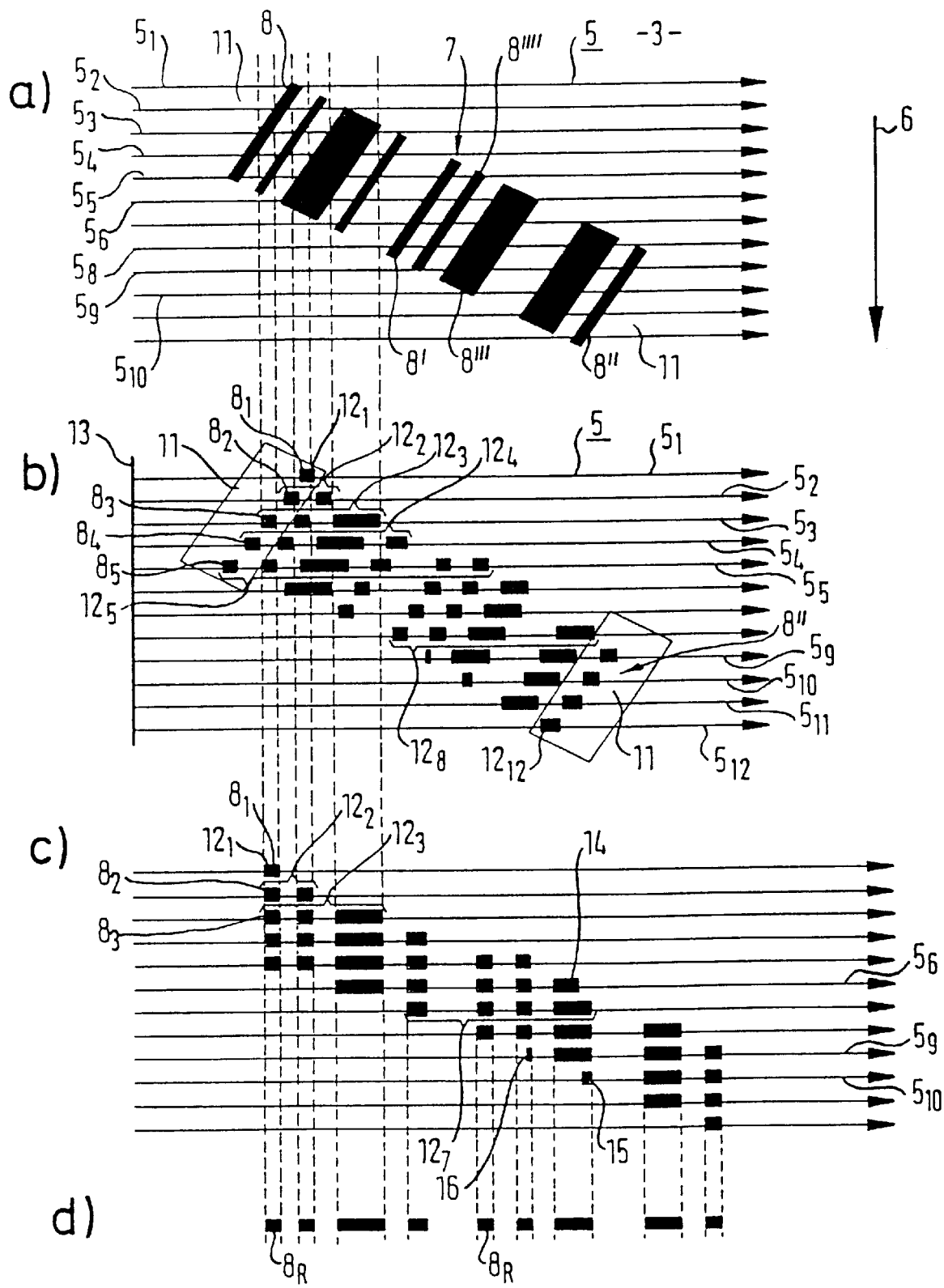

If the bar code 7 which is to be scanned is terminated in a standardized manner with white zones 11, as shown in FIG. 3, then the start or the end of the bar code 7 can be recognized by the ratio of the width of the white zone 11 to the width of the code element 8 following it. If the ratio of the width of the white zone to the width of the next dark zone forming the code element 8 is greater than the predetermined minimum value, then this sensed dark zone can represent the first code element 8, and thus the start of the bar code 7. In corresponding manner, a recognized element can be identified as the possible end of the bar code 7 when the ratio of the width of the recognized element to the width of the adjoining white zone is smaller than a predetermined value. For different code types a comparison of the white zone with a predetermined element other than the first or the last code element can be advantageous. For the code 128, for example, a comparison with the second or penultimate bar element can be advantageous.

If these described, so-called start and stop ratios are recognized, then the elements recognized along the actual scanning line can be classified as possible code element sections of a code segment of a bar code 7. In this respect, those regions of a code element which are swept over by the respective scanning line 5 are termed code element sections, while respective regions of the bar code 7 extending along the scanning line 5 are termed code segments and consist of one or more sequential code element sections lying on the respective scanning line 5.

After the recognition of a start or stop ratio on a scanning line, the code segment which is thus recognized is checked to see whether it contains a start or stop marking of the type of bar code sought.

If one considers FIG. 3a, then the white zone 11 and the subsequent code element 8 are in each case recognized along the scanning lines $5_1$ to $5_5$. In accordance with FIG. 3b, the scanned regions of the code element 8 sensed by the scanning lines $5_1$ to $5_5$ form code element sections $8_1$ to $8_5$. Furthermore, the respective code segments $12_1$ to $12_{12}$ are formed by the code element sections respectively lying on a scanning line, with the code segment $12_1$ for example consisting only of one code element section $8_1$, the code segment $12_2$ consisting of two code element section $8_2$, the code element $12_3$ consisting of three code element sections $8_3$, the code segment $12_4$ consisting of four code element sections $8_5$ and the code segment $12_5$ consisting of six code element sections $8_5$.

Since each of these code segments $12_1$ to $12_5$ forms the start of the bar code 7, the start marking respectively integrated into the bar code is recognized on checking each of these code segments.

In contrast, for example, when scanning along the scanning line $5_8$, the white region lying in the scanning direction in front of the code element 8' would admittedly lead to a possible start ratio first being detected on recognition of the code element 8'. The subsequent check for the presence of the start marking within the code element $12_8$ recognized along the scanning line $5_8$ would, however, lead to the decision that no start or end of the bar code 7 is present along the scanning line $5_8$.

The elements recognized along the scanning line $5_8$ are subsequently checked with respect to the described decision criteria as to whether they form, together with the recognized code element 8', a permissible code segment $12_8$ of the bar code 7.

If permissible code segments with start and/or stop markings are recognized for at least two neighboring scanning lines 5, as is the case in the present example for the code segments $12_1$ and $12_2$, and these code segments $12_1$ and $12_2$ and also the code segments $12_3$ to $12_{12}$ recognized during the further scanning are written into an image memory. The segmented image of the bar code 7 stored in the image memory is shown schematically in FIG. 3b). The stored code element sections have, in comparison to the code elements of the original bar code 7, a greater width by the factor 1/cos (tilt angle) as a result of the oblique path of the scanning lines 5. Since this factor is the same for all code elements, it can be appropriately compensated for by suitable decoding methods.

The storage of the detected code segments 12 is terminated when the stop marking corresponding to the recognized start marking, by which the storage was initiated, is detected a plurality of times. In FIG. 3b) this stop marking is schematically illustrated by the last code element 8", which was in each case recognized by the scans along the scanning lines $5_9$, $5_{10}$, $5_{11}$ and $5_{12}$. After recognition of the stop marking four times the storage of the code segment 12 is terminated, so that the segmented image of the bar code 7 shown in FIG. 3b) is present in the image memory.

Recognized, permissible code segments 12 can also advantageously be checked to see whether they exceed a predetermined minimum length or fall short of a predetermined maximum length. Only code segments 12 which satisfy both conditions are taken into the image memory.

If the length of a permissible code segment 12 is substantially the same as the total length of the scanned bar code 7, then this signifies that the bar code 7 was scanned over its full length, and in this case can be decoded in the conventional manner.

In a subsequent method step, in accordance with FIG. 3c), the segmented image of the bar code 7 deposited in the image memory is free of distortion, i.e. the oblique position of the image relative to the scanning lines 5 is compensated by a shear angle correction. In this respect, the shift of the respective positions of the start markings for the individual scanning lines 5 is found for the correction of the distortion in relation to a common straight reference line 13 standing perpendicular to the scanning direction. Since the corresponding shift or shift is not only present for the respective start marking, but rather for each segmented code element 8 stored for the respective scanning line 5, it is, for example, sufficient to determine the shift of the code element section $8_2$ forming a start marking recognized for the scanning line $5_2$ in comparison to the code element section $8_1$ forming a start marking recognized for the scanning line $5_1$, and to shift the code element section by one times the shift, to shift the code element sections of the code segment $12_3$ stored for the scanning line $5_3$ by twice the shift, to shift the code element sections of the code segment $12_4$ stored for the scanning line $5_4$ by three times the shift etc. in the image memory in the direction corresponding to the scanning direction and so on. In this way the distortion corrected, segmented image of the bar code 7 shown in FIG. 3c) arises in the image memory.

As can be seen from FIG. 3c), each code element 8 of the bar code 7 is represented in the image memory by a plurality of mutually associated detected code element sections $8_1$, $8_2$, $8_3$. In this respect, most of the code element sections $8_1$, $8_2$, $8_3$ etc. each have a width which correspond substantially to the width of the corresponding code elements 8 of the bar code 7. Only the code element sections 14, 15 and 16 detected in the image memory have a reduced width in comparison to the corresponding original code elements 8''' and 8'''' respectively, because the scanning lines $5_6$, $5_9$ and $5_{10}$ associated with the detected code element sections 14, 15 and 16 did not intersect the original code elements 8''' and 8'''' over their full width, as is evident from FIG. 3a).

In a next method step, a respective reference code element $8_R$ shown in FIG. 3d) is formed from the mutually associated code element sections $8_1$, $8_2$, $8_3$ etc. representing the original code element 8 and stored in the image memory. For this purpose, an average value formation is in each case carried out over the width of the respectively, mutually associated code element sections $8_1$, $8_2$, $8_3$, with individual binarization errors being tolerated.

Since the average value formation relates to individual code elements, and not to the position, the influence of large area distortions, which, for example, arise with curved surfaces, are compensated.

For the average value formation use can optionally be made of the arithmetic mean value or of the median value.

The arithmetic mean value is calculated in accordance with the following formulae:

$$meb(n+1) = (meb(n) \cdot multi(n) + neb)/(multi(n)+1)$$

$$multi(n+1) = multi(n)+1$$

in which the terms have the following meanings:
- meb(n+1): new average element width
- meb(n): previous average element width
- neb: width of the corresponding element in the actual code segment
- multi(n+1): new multiple reading of the actual element
- multi(n): prior multiple reading of the actual element.

If the median value is used to determine the respective reference code element in place of the arithmetic mean value formation, then the mutually associated code element sections $8_1$, $8_2$, $8_3$ etc. are first sorted in accordance with their width and subsequently the median value is determined as the width of the middle code element of the sorted sequence.

In a last method step the reference bar code consisting of the reference code elements is decoded. For this coding very high value and complex algorithms can be used, because a decoding does not have to be carried out for each scanning line, but rather only one single decoding has to be carried out for the entire bar code.

Figure 4:
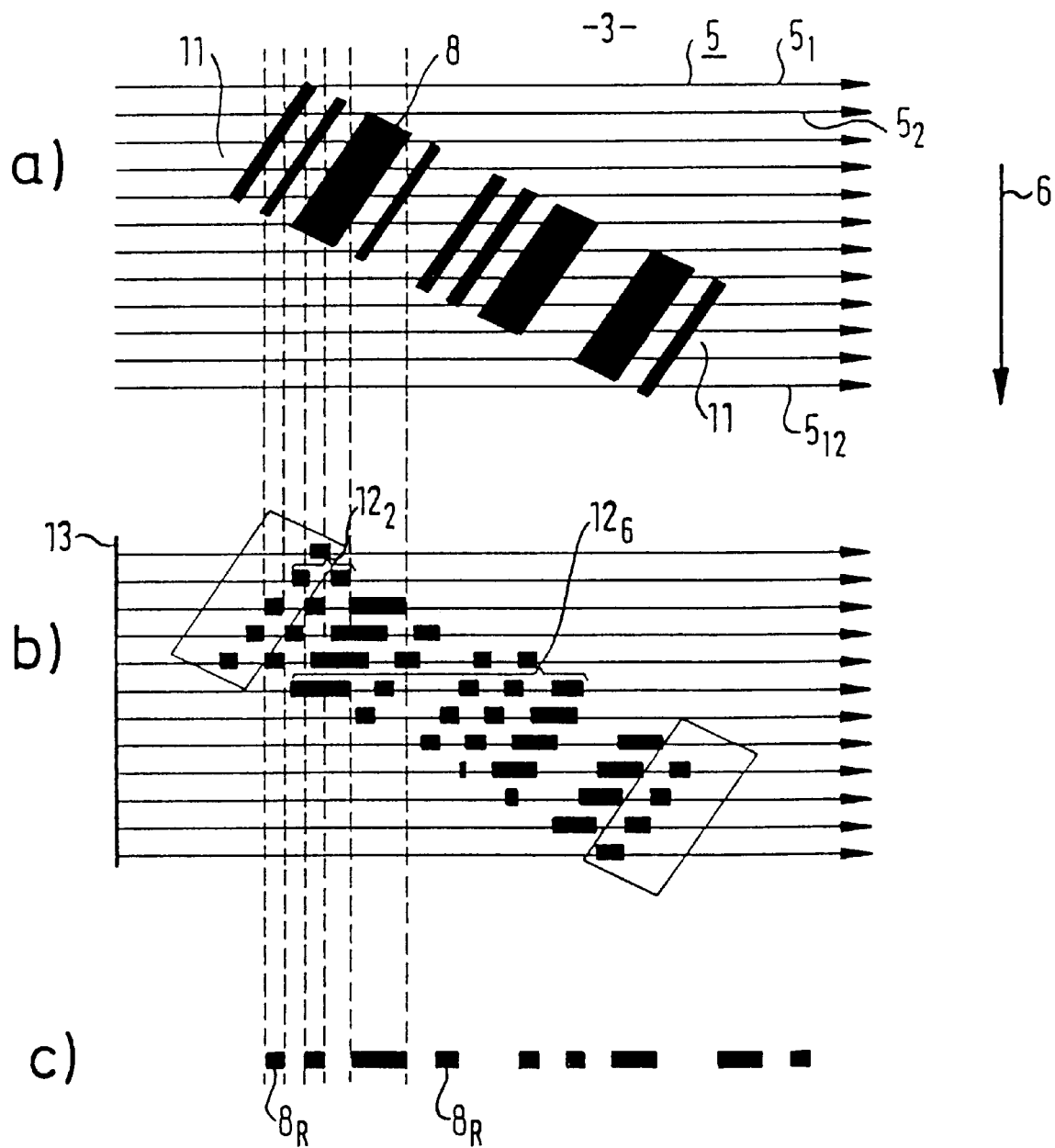

FIG. 4 shows a method section of a further embodiment of the method in accordance with the invention, in which, when compared with the method steps illustrated in FIG. 3, the storage and average value formation of the detected code element sections $8_1$, $8_2$, $8_3$ etc. are carried out in one step. In contrast to the variant of FIG. 3, the code element sections $8_1$, $8_2$, $8_3$ etc. stored still in the oblique position in the image memory are freed from distortion in accordance with the described method steps, whereupon the average value formation is directly carried out without separate storage. For each code element it is then only necessary to store the position freed of distortion and the multiple reading in the image memory, as is shown in FIG. 4c). In this manner, the storage space requirement of the method of the invention can be reduced.

Figure 5:
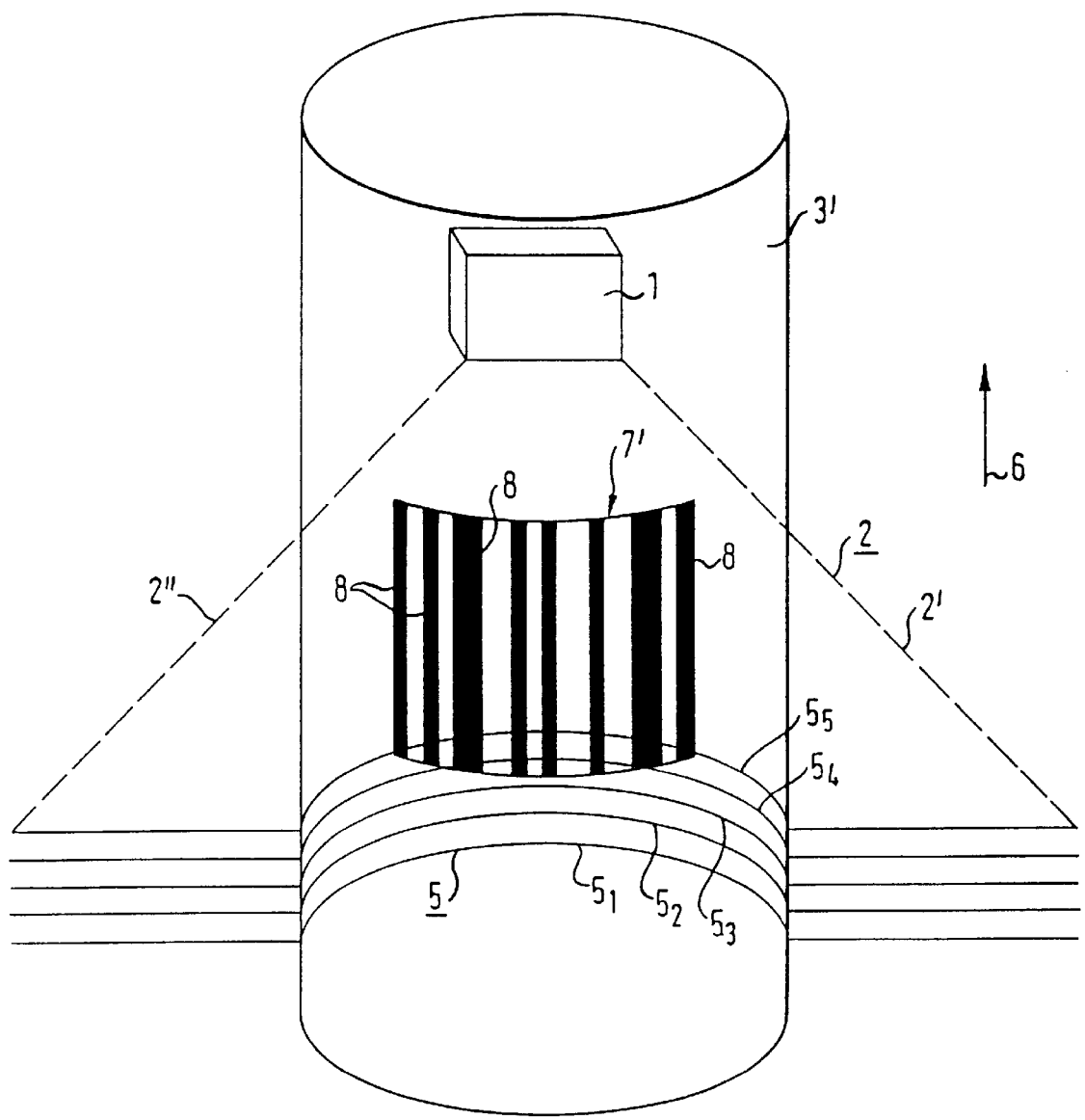
FIG. 5 is a schematic representation of a scan of a bar code which is applied to an article having a cylinder-like jacket.

In FIG. 5 a cylindrically shaped article 3' is provided with a bar code 7' at its curved surface. The bar code 7' is scanned by a bar code reader 1 which transmits a scanning beam 2, with the scanning beam 2 incident onto the surface of the article 3' forming scanning lines 5. As in FIG. 1, the mutually, spaced apart scanning lines in the scanning apparatus shown in FIG. 5 are produced wherein the scanning beam 2 is pivotable between 2 extreme positions 2' and 2'', and, on the other hand, along an arrow 6.

As can be seen from FIG. 5, the scanning lines 5 likewise have a curved path as a result of the curved surface of the article 3'. The first scanning line 5 to sweep over the bar code 7' in the course of the scan sweeps neither at the beginning nor at the end, but rather only over a middle zone of the bar code 7'. A variant of the scanning process of the invention for the scanning of bar codes mounted on curved or kinked surfaces is thus distinguished from the previously described embodiment wherein the detection of the code segments does not start with the recognition of a plurality of sequential start and/or stop markings, but rather when substantially identical or partly identical code segment sections are recognized for a plurality of sequential scanning lines. In this respect, code segment sections count as being substantially identical or partly identical when a specific percentage, for example 90% of the code elements agree within the code segment section. When comparing the individual code elements, a predetermined tolerance range can be taken into account, so that, for example, with deviations in the width of two code elements to be compared up to plus or minus 50% of the width of the narrowest detected code element, the two code elements to be compared can still be classified as the same. The remaining method steps correspond to the steps described with respect to the FIGS. 1 to 4. As a start criterion for the detection of the code segments, a combination of the examination for start and stop markings and also the examination for a partly identical zone can also be used. This applies both for bar codes which are applied to a curved surface, and also to bar codes applied to a flat surface.

Figure 6:
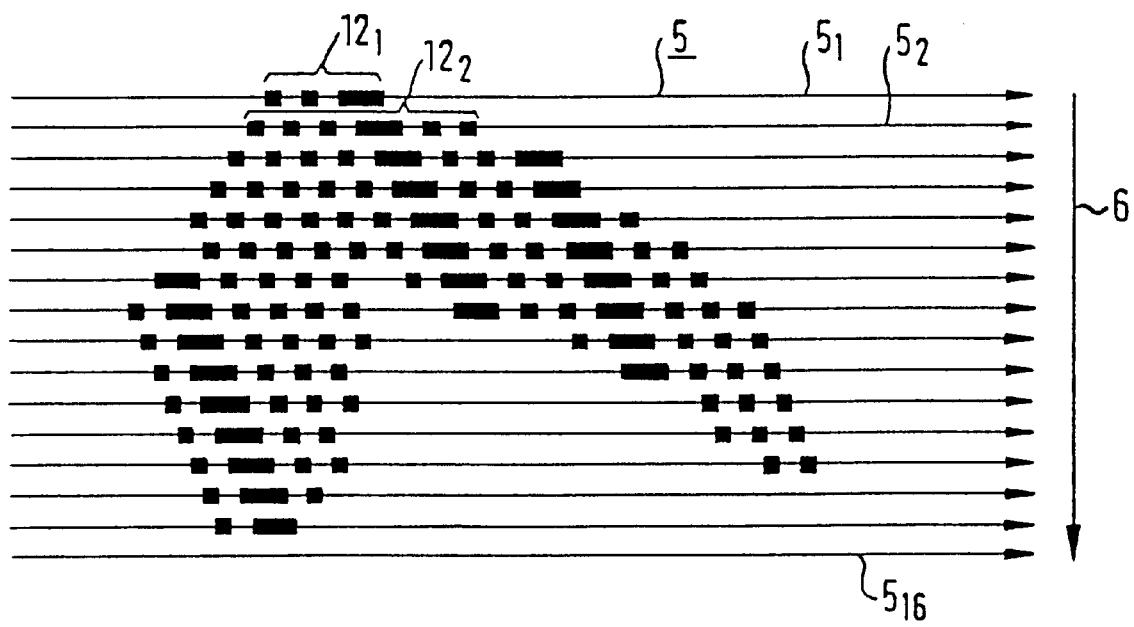
FIG. 6 is schematically illustrated scanning results of an intermediate step of the method of the invention in a scan in accordance with FIG. 5.

FIG. 6 shows the segmented image of the bar code 7' of FIG. 5 stored in an image memory. In this case, the detection of the code segments is started with recognition of the second code segment $12_2$, because the first recognized code segment $12_1$ is fully contained in this code segment.

The image shown in FIG. 6 is processed analogously to the method described with respect to FIGS. 3 and 4, so that ultimately a reference bar code is produced which is representative for the original bar code 7.

In this case, the oblique position of the image 7' of the bar code stored in the image memory is not determined while the recognition of start/stop patterns, but rather by pattern matching or decoding attempts for individual marks. The oblique position of the stored bar code can then be found via the position of the marks recognized in this manner on the individual scanning lines. The recognition of the inclined position in this manner is basically also possible with a bar code on a flat surface, in which the first scanning line to sweep over it in the course of scanning the bar code does not first sweep over the central region, but rather the start or the end of the bar code. The presence of a sought number of code elements or a specific code length can be selected as the criterion for the termination of the storage in the image memory in place of the described multiple recognition of mutually associated start/stop markings. Furthermore, it is also possible to select a predetermined time limit, within which no additional data is any longer deposited in the image memory. If no valid code segment is any longer found within the predetermined time limit, then this is evaluated as an end condition and the image memory is closed. This is thus available for the detection of new data.

What is claimed is:

1. A method of reading a bar code consisting of a predetermined number of code elements for generation of a binary signal with sequential high and low phases, the lengths of which correspond to the width of the sequential code elements, the method comprising:

sensing the code elements by one or more sensing beams of a bar code reader along scanning lines extending substantially parallel to one another, wherein each region of a code element sensed by a scanning line forms a code element section;

detecting, for substantially each scanning line, those codes segments that consist of a code element section or a plurality of sequential code element sections, which are recognized as permissible code segments on the basis of preset decision criteria;

finding in each case a reference code element from mutually associated code element sections, each representing the same code element of the bar code for different scanning lines;

storing detected permissible code segments in an image memory;

after the detection and storing of the permissible code segments, freeing of distortion the segmented image of the bar code deposited in the image memory for allowing the forming of the reference code element;

determining a shift between code elements detected for two adjacent scanning lines;

shifting each code segment stored for a certain scanning line within the image memory by such an element of said shift that corresponds to the distance of said certain scanning line from said two adjacent scanning lines; and producing the binary signal from the reference code elements.

2. A method in accordance with claim 1, wherein a shift present in the scanning direction between code segments detected for different scanning lines, and arising as a result of a scanning direction extending obliquely to the code elements, is evaluated in the sense that respective code element sections detected for different scanning lines are used correspondingly shifted relative to one another as the mutually associated code element sections.

3. A method in accordance with claim 2, wherein the shift is determined with respect to a straight reference line extending substantially perpendicular to the scanning lines.

4. A method in accordance with claim 1, wherein the mutually associated code element sections respectively detected for different scanning lines are determined by calculation of lines of regression for at least one of the start and end of the respective code element sections.

5. A method in accordance with claim 1, wherein at least one of the start and the end of the bar code is determined by means of predetermined start and/or stop patterns provided in the bar code.

6. A method in accordance with claim 5, wherein the detection of the admissible code segments starts when the start pattern and/or stop pattern is recognized for at least two adjacent scanning lines.

7. A method in accordance with claim 5, wherein the detection takes place for the scanning line containing the first recognized start and/or stop pattern and also for the scanning lines following it.

8. A method in accordance with claim 5, wherein the detection of the permissible code segments is terminated when a stop and/or start pattern corresponding to the recognized start and/or stop pattern has been recognized a plurality of times.

9. A method in accordance with claim 1, wherein the detection of the permissible code segments starts when substantially identical code segment sections are recognized for at least two sequential scanning lines.

10. A method in accordance with claim 5, wherein the shift between the code segments detected for different scanning lines is determined by the shift between the start patterns recognized for the corresponding scanning lines.

11. A method in accordance with claim 5, wherein the shift between the code segments detected for the different scanning lines is determined from the shift between the stop patterns recognized for the corresponding scanning lines.

12. A method in accordance with claim 1, wherein no permissible code segment is present when a minimum width of a scanned element in the scanning direction falls below a permissible minimum width.

13. A method in accordance with claim 12, wherein the permissible minimum width is determined in dependence on at least one of the reading distance and the print resolution of the bar code.

14. A method in accordance with claim 1, wherein no permissible code segment is present when a maximum width of a sensed element in the scanning direction exceeds a permissible maximum width.

15. A method in accordance with claim 14, wherein the permissible maximum width is determined in dependence on at least one of the reading distance and/or the print resolution of the bar code.

16. A method in accordance with claim 1, wherein no permissible code segment is present when, on using a two-width code, a ratio of sensed elements is greater than 3:1 or smaller than 1:3.

17. A method in accordance with claim 1, wherein no permissible code segment is present when, on using a multi-width code, a ratio of sensed elements is greater than 4:1 or smaller than 1:4.

18. A method in accordance with claim 1, wherein no permissible code segment is present when the running length or number of elements of the code segment falls short of a predetermined minimum length or minimum number.

19. A method in accordance with claim 1, wherein no permissible code segment is present when the running length or number of elements of the code segment exceeds a predetermined maximum length or a predetermined maximum number.

20. A method in accordance with claim 5, wherein the start pattern is formed by a white zone, with the ratio between the width of the white zone in the scanning direction and the width of the subsequent code element being greater than a predetermined minimum value.

21. A method in accordance with claim 5, wherein the stop pattern is formed by a white zone, with the ratio between the width of the last code element and the width of the subsequent white zone in the scanning direction being smaller than a predetermined minimum value.

22. A method in accordance with claim 5, wherein the start pattern is formed by a start marking provided in the bar code.

23. A method in accordance with claim 5, wherein the stop pattern is formed by a stop marking provided in the bar code.

24. A method in accordance with claim 1, wherein the bar code is decoded from the binary signal, which is produced from the reference code elements.

25. A method in accordance with claim 1, wherein the bar code is decoded from the binary signal, which is produced from the code segment detected for one scanning line when the length of the detected code segment is substantially the same as the running length of the bar code.

26. A method in accordance with claim 1, wherein in each case, the width of a reference code element is determined by forming the average value of the widths of the corresponding, mutually associated code element sections detected for the different scanning lines.

27. A method in accordance with claim 26, wherein an arithmetic average value is formed.

28. A method in accordance with claim 26, wherein a median value is used as the average value.

29. A method in accordance with claim 1, wherein the reference code elements are stored in an image memory.

30. A method in accordance with claim 1, wherein the scanning lines have a substantially equidistant spacing from one another.

31. An apparatus for reading a bar code consisting of a predetermined number of code elements for the generation of a binary signal with sequential high and low phases, the lengths of which correspond to the width of sequential code elements, in particular with a reading direction extending obliquely to the code elements wherein a bar code reader which transmits one or more scanning beams for the sensing of the code elements along scanning lines extending substantially parallel to one another, wherein each region of the code element sensed by a scanning line forms a code element section, a code segment selection means is provided for the determination of permissible code segments as a result of predetermined decision criteria and consisting of one code element section, or of a plurality of sequential code element sections, a code segment detection means is provided for the detection of the code segments recognized as permissible by the code segment selection means for substantially each scanning line, by a reference code element determining means for determining in each case a reference code element for respective, mutually associated code element sections representing the same code element of the bar code and detected for different scanning lines, an image memory for storing the detected, permissible code segments, a shift determining means for determining the shift between two code segments detected for two adjacent scanning lines and stored in the image memory, a code segment shifting means for shifting within the image memory a code segment stored in the image memory for a certain scanning line by such a multiple of said shift which corresponds to the distance between said certain scanning line from said two adjacent scanning lines, and a signal generating means is provided for the generation of the binary signal from the reference code elements.

32. A method of reading a bar code consisting of a predetermined number of code elements for generation of a binary signal with sequential high and low phases, the lengths of which correspond to the width of the sequential code elements, the method comprising:

sensing the code elements by one or more sensing beams of a bar code reader along scanning lines extending substantially parallel to one another, wherein each region of a code element sensed by a scanning line forms a code element section;

detecting, for substantially each scanning line, those codes segments that consist of a code element section or a plurality of sequential code element sections, which are recognized as permissible code segments on the basis of preset decision criteria;

finding in each case a reference code element from mutually associated code element sections, each representing the same code element of the bar code for different scanning lines;

carrying out a two-dimensional Fourier transform of the detected code segments and determining the maximum amplitudes of the spectrum of magnitude that is found;

determining the tilt angle between the scanning direction and the direction perpendicular to the bar orientation of the bar code from the position of the maximum amplitudes;

calculating the shift between the code element sections respectively detected for different scanning lines from the tilt angle;

compensating the shift; and producing the binary signal from the reference code elements.

33. A method in accordance with claim 32, wherein a shift present in the scanning direction between code segments detected for different scanning lines, and arising as a result of a scanning direction extending obliquely to the code elements, is evaluated in the sense that respective code element sections detected for different scanning lines are used correspondingly shifted relative to one another as the mutually associated code element sections.

34. A method in accordance with claim 4 wherein the mutually associated code element sections respectively detected for different scanning lines are detected for sequential scanning lines.

35. A method in accordance with claim 16 wherein the ratio of sensed elements is a ratio of sequential sensed elements.

36. A method in accordance with claim 17 wherein the ratio of sensed elements is a ratio of sequential sensed elements.

37. A method in accordance with claim 19 wherein a predetermined maximum length is a running length of the bar code.

38. A method in accordance with claim 1 wherein the width of the sequential code elements corresponds to a reading direction extending obliquely to the code elements.

39. A method in accordance with claim 32 wherein the width of the sequential code elements corresponds to a reading direction extending obliquely to the code elements.

* * * * *